Sheet. I

Hiram S. Maxim's Steam Gas Generator For Locomotive Head Lights, and other purposes.

3950

REISSUED MAY 3 1870

Witnesses.
John Cochrane
L. M. Norwood

Inventor.
Hiram S. Maxim

Sheet II.

Hiram S. Maxim's Steam Gas Generator

For Locomotive Head Lights, and other purposes.

Witnesses.
John Cochrane
J. M. Norwood

Inventor.
Hiram S. Maxim.

UNITED STATES PATENT OFFICE.

HIRAM S. MAXIM, OF NEW YORK, N. Y.

IMPROVEMENT IN STEAM GAS-GENERATORS.

Specification forming part of Letters Patent No. 71,400, dated November 26, 1867; Reissue No. 3,950, dated May 3, 1870.

*To all whom it may concern:*

Be it known that I, HIRAM S. MAXIM, of the city, county, and State of New York, have invented a new and useful Improvement in Locomotive Head-Lights; and I do hereby declare that the following is a full, clear, and exact description thereof, reference being had to the accompanying drawings, making part of this specification, and in which—

Figure 1:
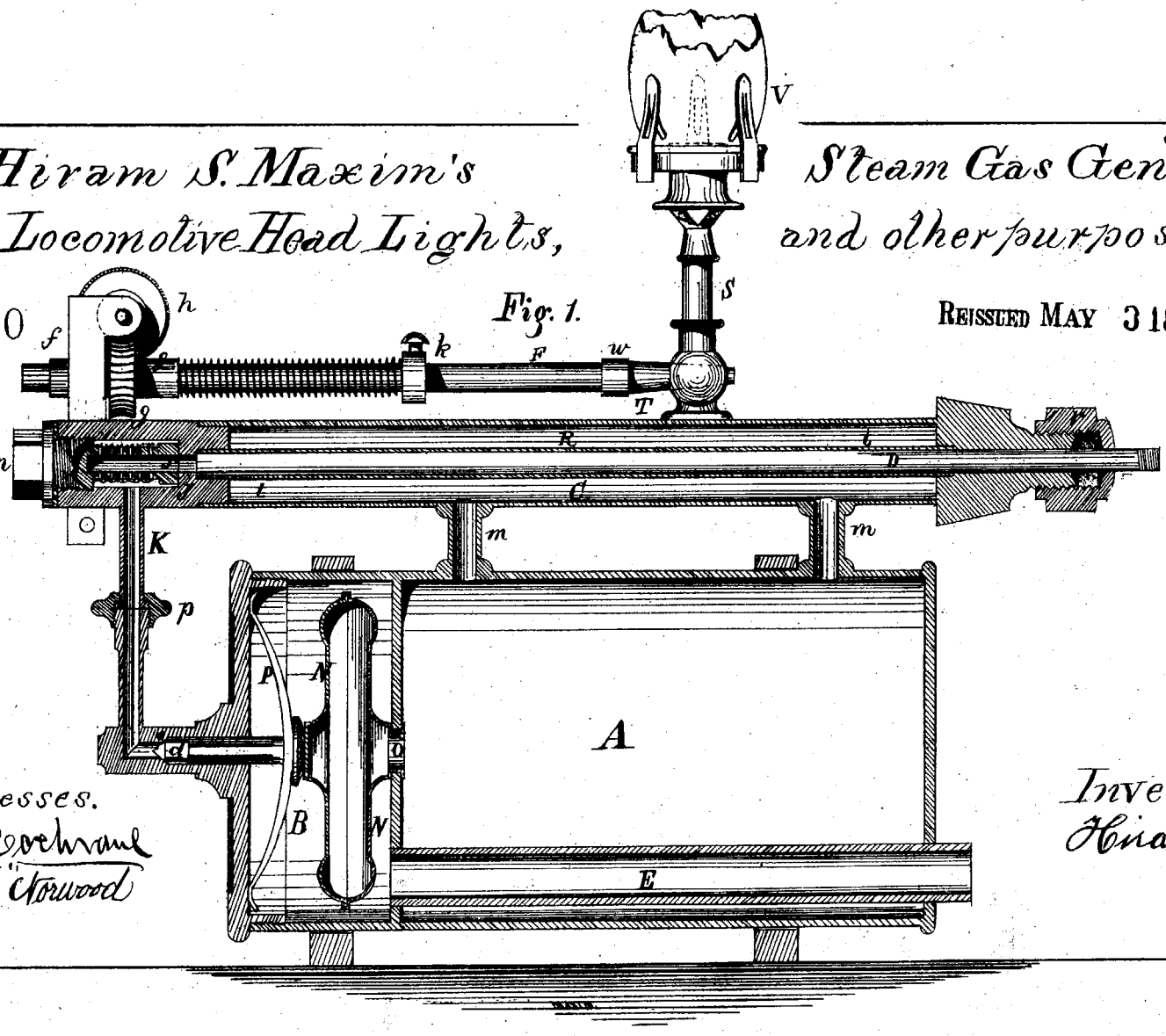
Figure 2:
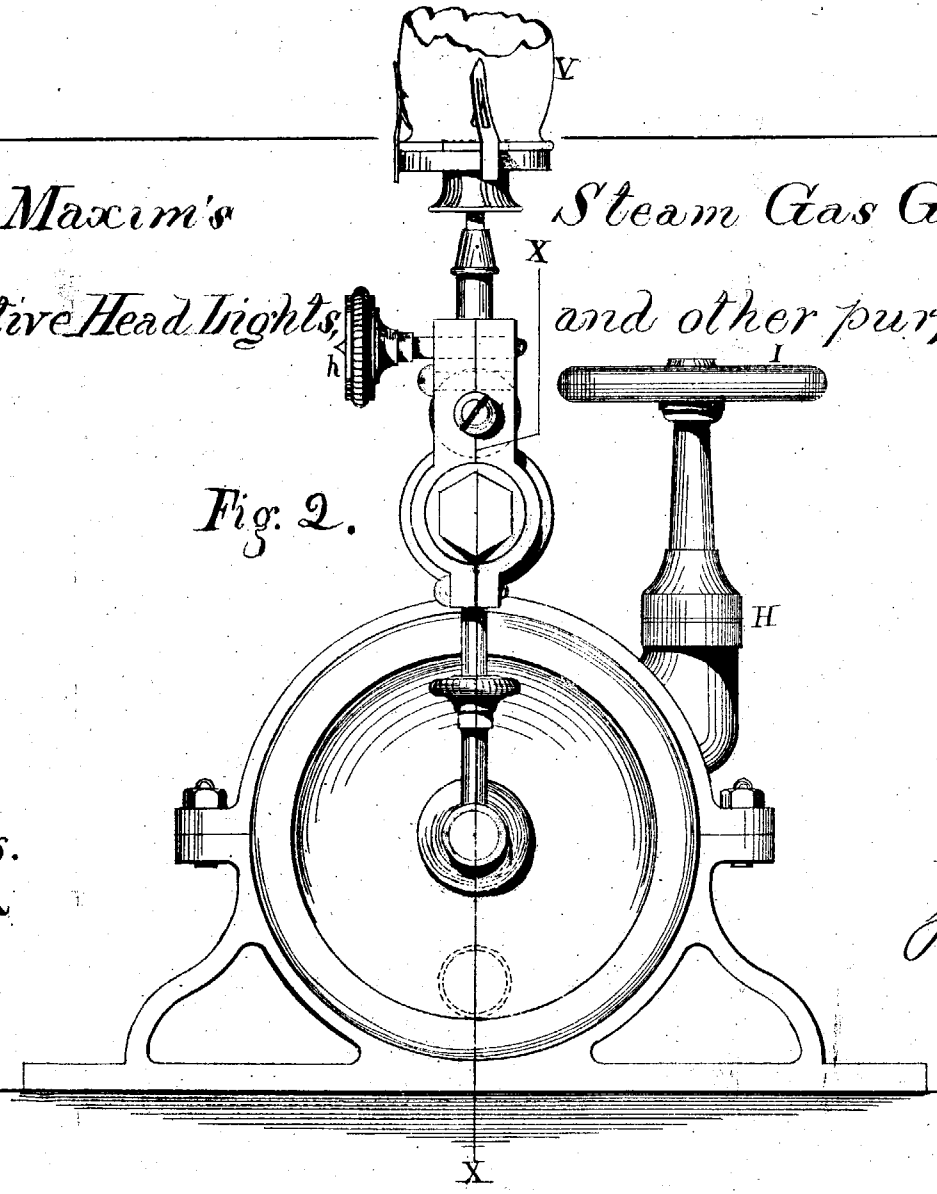

Figure 1 is a longitudinal vertical section of the apparatus, showing the various parts in their proper positions, the section being through the line *x x* in Fig. 2. Fig. 2 is a front elevation of the apparatus, or an end view thereof.

The same parts, where they occur in both figures, are indicated by the same letters of reference.

The nature of my invention consists in illuminating the head-lights of locomotive-engines with the gas of volatile oils or hydrocabon fluids generated by the heat of steam from the boiler, which is conveyed and applied to the apparatus for that purpose; also, in superheating the gas before it passes to the burner of the head-light; also, in controlling and limiting the production and supply of the gas to the proper consumption of the burner by regulating the flow of the steam to or through the generator by the pressure of the gas so generated.

To enable others skilled in the art to make and use my invention, I will proceed to describe its construction and operation.

I make a strong and tight cylindrical vessel, A, of sheet-iron or other suitable material, also making an inclosing-jacket or steam-chamber, B, at the front end thereof, by means of an inner head or diaphragm, as shown. Within the steam jacket or chamber B, I place the elastic vessel N N, composed of flexible disks of thin sheet metal, and connecting centrally with the inner head or diaphragm of the cylindrical vessel A by means of the tubular coupling *o*, thus connecting the interior of the elastic vessel N N with the interior of the cylindrical vessel A, the center of the other disk being attached to the spring P for purposes presently to be explained. The cylindrical vessel A is called the "tank" and the elastic vessel N N is called the "regulator," and both these vessels constitute the generating apparatus.

Immediately over the cylindrical vessel A is another cylindrical vessel, C, of smaller diameter, and connecting with it by means of the tubular branches *m m*. Within this cylindrical vessel C there is a central tube, *t t*, the ends of which are secured steam-tight in the end pieces of said vessel C. This vessel is called the "superheater."

Through the central tube, *t t*, of the superheater C, and through the stuffing-box *r* at the back end of it, I pass the tube D, which connects by its outer end with the steam-boiler, thus forming a telescope-joint connection between the gas apparatus within the head-light case and the boiler of the locomotive, so that the whole gas apparatus may be drawn forward from its position in the head-light case when required, and be again returned to its place without disturbing the connection of the steam-pipe D with the apparatus and the boiler of the locomotive.

In the front end piece, J, of the superheater C is a small chamber which is closed outwardly by the screwed plug *n*; and in the inner end of this chamber is secured a short piece of small-size tube, J′, which opens into the central tube, *t t*, and thus has a free communication with the steam-pipe D. Around this short tube J′ is a small cylindrical screen of fine wire-gauze, through which gauze the steam filters or passes before reaching the controlling-valve, hereinafter described, thereby effectually freeing the steam from all feculent matter that may have come over with it from the boiler, and which, without being thus separated from the steam, might interfere with the working of the said controlling-valve. The steam having passed through the wire-gauze screen, enters by the tube K below the conical valve D, and into the steam jacket or chamber B, and then outward through the tube E in the lower part of the tank A, from which tube E the out flow of the steam may be controlled in any convenient manner, and may be conducted to any convenient place. The arrangements for both of said purposes being well known in the art, need not be further described. The stem of the valve *d* is attached to the spring P, and by the latter to the center of the outer disk of the elastic vessel N N, so that any expansion or contraction of this vessel will operate to close or open the steam-valve *d*.

On the upper side of the superheater C a stop-cock, T, is attached, and upon this stop-cock is secured the service-pipe S and the lamp or burner V of the head-light.

For the convenience of adjusting the flame of the burner V to the necessary size or power for the head-light, the stop-cock T connects by means of the rod F with the standard *f* on the front part of the cylindrical vessel C, in which standard there is mounted a worm or endless screw, which is rotated by pressing the fingers on the periphery of the knurled wheel *h*. The worm gearing into the screw-wheel *g*, turns the rod F, to which it is secured, and with it the top of the stop-cock T, and thereby raises or lowers the flame of the head-light, or increases or diminishes its power to the desired degree with the greatest accuracy.

The spiral spring, shown on the rod F between the boss *g'* of the screw-wheel *g* (which slides upon a feather and bears against the standard *f*) and the collar *k*, is to keep the top of the stop-cock T securely to its place notwithstanding the jar or tremor which may be communicated to the apparatus by the jolting of the locomotive in its passage along the railroad.

The apparatus being thus constructed and combined with the steam-boiler, a quantity of gasoline or hydrocarbon fluid is poured into the tank A through an inlet H, (Fig. 2,) which inlet is closed and secured by a screwed plug attached to the shank of the hand-wheel I. The tank being about two-thirds full, a portion of the fluid will pass through the coupling *o* into the elastic vessel N N. The tank being supplied with the gasoline, steam is admitted to the apparatus through the tube D from the boiler, passing, first, through the superheater C, then through the wire-gauze at J', then down through the tube K and valve-seat *e* into the steam-jacket B, which incloses the elastic vessel N N, and then outward through the tube E in the lower part of the tank A, either as steam or as hot water, according to the size of the vent given to the outflow of the pipe E. The heat of the steam or hot water, as the case may be, will quickly act upon the volatile fluid and fill the vacant space in the generating apparatus and the superheater with the vapor or gas of such fluid, till the elastic vessel N N, which is completely surrounded with the steam, becomes so distended or expanded by the pressure of the gas within it that it will act against the spring P and the stem of the valve *d*, thereby closing the valve *d* to its seat *e* in the steam-pipe K, and thus shutting off the steam from the generator and checking the vaporization of the fluid or the production of the gas. If now the stop cock T is opened, the gas will pass up through the tube S to the burner V. The vent thus given to the gas will reduce its tension or pressure within the apparatus and cause a corresponding contraction in the elastic vessel N N, thus permitting the spring P to retract and open the valve *d*, allowing the steam to re-enter the chamber B and tube E, thus causing a further generation of gas from the fluid contained in the tank and the expanding-vessel to supply the consumption at the burner V.

Upon admitting steam from the boiler the apparatus is very quickly heated to the necessary degree for generating the gas, and when the gas is ignited at the burner V, and the flame adjusted to the required power for the head-light by the stop-cock T, the whole operation of making the gas and controlling its force will proceed without further manual interference or adjustment by the automatic action of the elastic vessel N N in controlling the steam-valve *d*; and the gas thus produced being superheated by the passing of the steam through the central tube, *t t*, of the cylindrical vessel C, every particle of the fluid is vaporized into a gas that will burn with a brilliant steady flame of great illuminating power, particularly suitable for the head-lights of locomotives and surpassing any light heretofore used for that purpose, and is in nowise affected by high speeds or by the jolting or vibration of the locomotive.

I do not confine myself to the exact details and arrangement of the apparatus as herein described, nor to any particular construction of the parts of the apparatus, as such parts may be readily varied in form without thereby changing their functions; or mechanical equivalents may be substituted for some or perhaps all the devices herein described without thereby changing the character or principle of the invention.

Having now described the nature, construction, and operation of my apparatus for generating gas from volatile oils or hydrocarbon fluid by means of steam for illuminating locomotive head-lights, what I claim therein as my own invention, and desire to secure by Letters Patent of the United States, is—

1. A head-light or front lamp for locomotive-engines, in which the flame or light is produced from the vapor of volatile hydrocarbon fluids when generated by the heat of the steam drawn from the boiler and applied to the apparatus for that purpose, substantially as described.

2. Superheating the gas by the steam in its passage from the generator to the burner, substantially as described.

3. Controlling the flow of the steam to or through the generator and the production of the gas by the pressure of the gas so generated, in the manner and by the means substantially as described.

4. In combination with a steam gas-generating apparatus for locomotive head-lights, the telescope-joint connection or its equivalent in the steam-pipe between the apparatus and the steam-boiler, in the manner and for the purpose substantially as described.

5. The wire-gauze screen or its equivalent in the steam-passage of the apparatus, constructed and operating in the manner and for the purpose substantially as described.

6. The combination of the steam-jacket with the hydrocarbon-gas generator, substantially as described.

HIRAM S. MAXIM.

Witnesses:
JOHN COCHRAN,
I. M. NORWOOD.